(12) United States Patent
Dooley et al.

(10) Patent No.: US 7,784,679 B2
(45) Date of Patent: Aug. 31, 2010

(54) PRODUCT INFORMATION AND ADVERTISING SYSTEM

(75) Inventors: Chris Dooley, New Canaan, CT (US); Arthur A. Rotelli, III, Fairfield, CT (US); Robert S. Frichette, Trumbull, CT (US); George N. Kringel, Fairfield, CT (US); Paul S. Nielsen, Saratoga Springs, NY (US)

(73) Assignee: News America Marketing Properties, LLC, Chicago, IL (US)

( * ) Notice: Subject to any disclaimer, the term of this patent is extended or adjusted under 35 U.S.C. 154(b) by 964 days.

(21) Appl. No.: 11/446,629

(22) Filed: Jun. 5, 2006

(65) Prior Publication Data

US 2006/0273164 A1 Dec. 7, 2006

Related U.S. Application Data

(60) Provisional application No. 60/687,641, filed on Jun. 3, 2005.

(51) Int. Cl.
*G06K 15/00* (2006.01)
(52) U.S. Cl. ....................... 235/378; 235/383
(58) Field of Classification Search ................ 235/376, 235/378, 383, 377
See application file for complete search history.

(56) References Cited

U.S. PATENT DOCUMENTS

| | | | | |
|---|---|---|---|---|
| 5,977,998 | A * | 11/1999 | Briechle et al. | 345/501 |
| 6,098,049 | A * | 8/2000 | Goodwin et al. | 705/21 |
| 6,249,263 | B1 | 6/2001 | Kayser et al. | 345/1 |
| 6,271,807 | B1 | 8/2001 | Kayser et al. | 345/2 |
| 6,390,364 | B1 * | 5/2002 | Matsushita | 235/383 |
| 6,552,663 | B2 | 4/2003 | Swartzel et al. | 340/572.1 |
| 6,715,675 | B1 | 4/2004 | Rosenfeld | 235/383 |
| 6,715,676 | B1 * | 4/2004 | Janning | 235/383 |
| 6,753,830 | B2 * | 6/2004 | Gelbman | 345/55 |
| 6,781,514 | B2 | 8/2004 | Murofushi | 340/636.1 |
| 6,781,580 | B2 | 8/2004 | Crooks | 345/211 |
| 6,886,745 | B2 * | 5/2005 | Berrube et al. | 235/383 |

(Continued)

OTHER PUBLICATIONS

Bruce Fox for National Retail Federation, "Electronic Shelf Labels Draw New Interest as Prices Fall" Jan. 2002, www.stores.corg, 4 pages.

(Continued)

*Primary Examiner*—Thien M. Le
*Assistant Examiner*—April A Taylor
(74) *Attorney, Agent, or Firm*—St. Onge Steward Johnston & Reens LLC (57) ABSTRACT

A point of sale advertising device that includes a display mechanism with a first screen and a second screen and the screens are facing in substantially different directions. The device also includes a display controller in communication with the screens, the display controller adapted to receive a price message and a timing instruction, to store the price message and timing instruction, and to transfer the price message to the first screen and second screen for display on the first screen and the second screen for a time period indicated by the stored timing instruction. The device also includes a price control switch in communication with the display controller, the price control switch being adapted to be actuated manually, and when actuated, prevents the price message from being displayed on the first screen and the second screen.

20 Claims, 6 Drawing Sheets

U.S. PATENT DOCUMENTS

| | | | |
|---|---|---|---|
| 2002/0005775 A1* | 1/2002 | Sonnendorfer et al. | 340/5.91 |
| 2003/0025690 A1* | 2/2003 | Crooks | 345/211 |
| 2003/0071764 A1* | 4/2003 | Peterson | 345/1.1 |
| 2003/0135772 A1* | 7/2003 | Haulk et al. | 713/324 |
| 2006/0156160 A1* | 7/2006 | Haulk et al. | 714/746 |

OTHER PUBLICATIONS

IBM Advertising Literature, "Telepanel Millennium PLUS Electronic Shelf Labels", International Business Machines Corporation 2000, 6 pages.

* cited by examiner

PRODUCT INFORMATION AND ADVERTISING SYSTEM

PRIOR APPLICATION

Applicants claim priority benefits under 35 U.S.C. §119(e) of U.S. Provisional Patent Application Ser. No. 60/687,641 filed Jun. 3, 2005.

FIELD OF THE INVENTION

This invention relates to in-store advertising displays and particularly to point of sale advertising displays.

BACKGROUND OF THE INVENTION

Point of sale pricing information is well known among retailers and those in the field of consumer products. For example, electronic shelf labels (ESLs) are well known in the retail community and are used on store shelves in close proximity to the product being sold primarily to indicate the price of products. An ESL can also include other marketing or sales information, however, because ESLs are typically used to display prices for the many products being displayed on a single store shelf, they are typically designed with a small screen with only limited screen space to display basic pricing and text information in an understated manner so as not to overwhelm or distract the purchaser with too much information. Each ESL typically has a single screen which lies flat against the edge of a store shelf to display the price for a single product. Because the single screen is place flush up against the shelf edge, the screen faces directly toward the aisle and has very limited visibility from the sides. Such an ESL can be difficult to see and read unless the viewer is positioned in a store aisle directly in front of the single screen of the ESL and perpendicular to the shelf. Because there must be an ESL for each different product sold in the store the ESL is typically relatively small and has very limited space for any type of display other than for the display of the price and a small message that do not change unless the pricing for the product is changes. If the ESL is too large it becomes difficult to fit all the required ESL's onto a single shelf that holds multiple products.

The pricing displayed on the ESL is typically controlled by a central location. For example, supermarket store owners control the price on the ESLs throughout at store using a central computer either at the store at a a main headquarters for multiple stores. Price updates or price changes are transmitted to each ESL by hard wire, wireless, low frequency or some other type of signal transmission. The price updates or changes or any other type of message to be displayed on the ESL is controlled by a store owner, not the advertiser or marketer of the products being sold. The only way to change or turn off the pricing is through the controller at a central location. The ability to change the price on the ESL at the point of sale location is typically not permitted in order to prevent a customer from improperly altering the price of a product.

It is also known in the prior art for advertisers and marketers to use preprinted materials at point of sale locations that include an advertising message such as references to product quality, special offers or special pricing. However, when printed material is used the advertising message is static and cannot be easily altered or changed. For example, if the pricing or the advertising message is wrong or inaccurate, a store owner must replace or remove the printed material all together. Removing, replacing or modifying the printed material at the store shelf requires employee time and adds to the operational costs for the display.

Advertisers and marketers also have a need to be able to quickly update and change marketing information at the point of sale in response to market demands. Many marketing strategies are time sensitive. For example, some marketing efforts may only offer a special price for a limited period time. Marketers and store owners want to be sure that any temporary price specials expire at the correct time and are not improperly extended resulting in a loss income. However, printed advertising including the special pricing at the point of sale will need to be manually posted at the beginning of the special pricing period and removed at the end of the pricing period. Failure to post and remove the printed materials at the proper time could result in lower sales and lost profits.

Accordingly, ESL's and printed point of sale advertising are limited as to how quickly messages can be updated and what messages can be displayed. The ability to quickly and easily change a price, quality or value message at the point of sale is extremely important. Advertisers and marketers also want the ability to have a reusable device that can easily and quickly be adapted to display different messages for different products at different point of sale locations. Advertisers and marketers also want a display screen sufficiently large to offer a variety of product messages and to be highly visible to consumers who approach the point of sale location from different directions.

There is also a need for an advertising device that allows a marketer to retain maximum control over the consumer price/value perception of a product at the shelf and that allows advertising at the point of sale for ongoing trade promotions or hot temporary price reduction price points. Further, there is also a need for a point of sale display system that controls the price and sales message for a given period of time without requiring a hardwired, IR and RF signal from a central computer controlled by the store owner to reprogram the device.

What is needed is a inexpensive, programmable, reusable, instantly changeable, highly visible multi-screen display and information device. A device that can attach to a store shelf at the point of sale and can be independently programmed to dynamically display. The device would also include a timer used to assist in determining that pricing and product information be displayed only for the appropriate time period. The device would also include a manually operated switch that can alternatively turn on and off pricing information to prevent apparent pricing errors.

SUMMARY OF THE INVENTION

Accordingly, it is an object of the invention to provide a programmable, highly visible multi-screen electronic display for point of sale advertising that includes multiple screens and allows the display to be viewed from opposite directions.

A further object of the invention is to provide a point of sale advertising device that displays pricing information and product information in a dynamic, graphic action that attracts a consumer's attention.

Still another object of the invention is to provide a point of sale advertising device that can be quickly adapted to display a variety of different messages and pricing in a variety of different graphic actions based on the desire of the user.

Yet a further object of the invention is to provide a point of sale advertising device that allows the user to maintain control of the advertised pricing. Using a timer built into the display mechanism, the user can terminate the display of pricing information at a preset desired time. The invention further provides a price control button that permits the user to toggle on and off the displayed pricing information.

Still yet another object of the invention is to provide a point of sale advertising device that is reusable and can be quickly and easily re-programmed when displayed messages, graphics or pricing need to be changed.

These and other objects of the invention are achieved in accordance with one exemplary embodiment of the present invention by provision of a point of sale advertising device includes a display mechanism, the display mechanism having a first screen and a second screen, the first screen and the second screen facing in different directions, a display controller in communication with the first screen and the second screen, the display controller adapted to receive a price message and a timing instruction, to store the price message and the timing instruction, and to transfer the price message to the first screen and the second screen for display on the first screen and the second screen for a time period indicated by the stored timing instruction; and a price control switch in communication with the display controller, the price control switch being adapted to be actuated manually, and when actuated, preventing the price message from being displayed on the first screen and the second screen.

In some embodiments the display controller is adapted to receive a value message, to store the value message and to transfer the value message to the first and second screen for displaying the value message. In other embodiments the price control switch is located in a cryptic location on the display mechanism.

In some embodiments the price message is displayed dynamically on the first screen and the second screen based on display instructions stored by the display controller.

In some embodiments the device includes a programming mechanism, the programming mechanism having a message transfer member adapted to communicate with the display mechanism, the message transfer member being adapted to transfer messages and instructions to the display controller, a data interface in communication with the programming controller, the data interface being adapted to receive data from a user, the data indicating the price message to be displayed on the first screen and the second screen, and indicating the timing instruction for the time period the price message is to be displayed on the first screen and the second screen.

In certain of these embodiments the programming mechanism includes a memory with pre-stored value messages that can be displayed on the display mechanism.

In some embodiments the price message is dynamically displayed on the first screen and the second screen based on display instructions stored by the display controller.

In some embodiments the programming controller is further adapted to receive data and convert the data to a value message and the display controller is further adapted to receive the value message from the programming mechanism, to store the value message and to transfer the value message to the first screen and the second screen for displaying the value message.

In some embodiments the programming mechanism includes a memory with pre-stored value messages that can be displayed on the display mechanism. In some embodiments the price message and value message are displayed one at a time on an alternating basis.

In some of the embodiments the price message and value message are displayed dynamically on the first and second screen based on display instructions sent by the programming mechanism to the display controller and stored on the display controller.

In some of the embodiments the device includes a display controller further adapted to receive a value message, to store the value message and to transfer the value message to the first screen and the second screen for displaying the value message. In certain of these embodiments the price control switch is located in a cryptic or inconspicuous location on the display mechanism. Also, in certain of these embodiments the price message and the value message are displayed dynamically on the first and second display screen based on display instructions stored by the display controller.

In some embodiments the programming mechanism is physically connected to the display mechanism when the pricing message, the timing instruction and the value message are being communicated from the programming mechanism to the display mechanism.

In accordance with another embodiment of the invention, the device has a display mechanism and a programming mechanism adapted to interface with the display mechanism to transfer a price message and a timing instruction to the display mechanism. The display mechanism has a first screen and a second screen, the first screen and the second screen facing in different directions. The display mechanism also includes a display controller in communication with the first screen and the second screen, the display controller adapted to receive a price message and a timing instruction, to store the price message and the timing instruction, and to transfer the price message to the first screen and the second screen for display on the first screen and the second screen for a time period indicated by the stored timing instruction. The display mechanism further includes a price control switch in communication with the display controller, the price controller being adapted to be actuated manually, and when actuated, preventing the price message from being displayed on the first screen and the second screen. The device also includes the programming mechanism having a message transfer member adapted to communicate with the display controller, the message transfer member being adapted to transfer messages and instructions to the display controller and a programming controller in communication with the message transfer member, the programming controller being adapted to receive data and convert the data to the price message and the timing instruction. The programming mechanism further includes a data interface in communication with the programming controller, the data interface being adapted to receive data from a user, the data indicating the price message to be displayed on the first screen and the second screen, and indicating the timing instruction for the time period the price message is to be displayed on the first screen and the second screen and wherein the price message is displayed dynamically on the first screen and the second screen based on display instructions stored by the display controller.

In accordance with still another embodiment of the invention, a method for advertising at a point of sale location having the steps of (i) mounting a display mechanism to a shelf, the display mechanism having a first screen and a second screen facing in different directions; (ii) connecting a programming mechanism to the display mechanism; (iii) inputting pricing data to the programming mechanism, converting the pricing data to a pricing message and communicating the price message to the display mechanism; (iv) inputting timing instruction data to the programming mechanism, converting the timing instruction data to a timing instruction and communicating the timing instruction to the display mechanism; (v) inputting value message data to the programming mechanism, converting the value message data to a value message and communicating the value message to the display mechanism; (vi) storing the price message, the timing instruction and the value message in the display mechanism; (vii) disconnecting the programming mechanism from the display mechanism; (viii) displaying the price message on the first screen and the second screen; (ix) displaying the value message on the first screen and the second screen; (x) repeating the last two steps; and (xi) terminating the display of the price message according to the timing instruction.

In some embodiments the method further includes the steps of: (i) inputting display instruction data to the programming mechanism, converting the display instruction data to a display instruction and communicating the display instruction to the display mechanism; (ii) storing the display instruction in the display mechanism; (iii) displaying the price message in accordance with the display instruction on the first screen and the second screen; and (iv) displaying the value message in accordance with the display instruction, on the first screen and the second screen.

In some other embodiments the method further includes the step of manually actuating a control switch to terminate the display of the pricing message prior to the time dictated by the timing instruction. Some of these embodiments further include the additional step of manually actuating the control switch to reinitiate the display of the pricing message for the time dictated by the timing instruction.

DETAILED DESCRIPTION OF THE DRAWINGS

Figure 1:
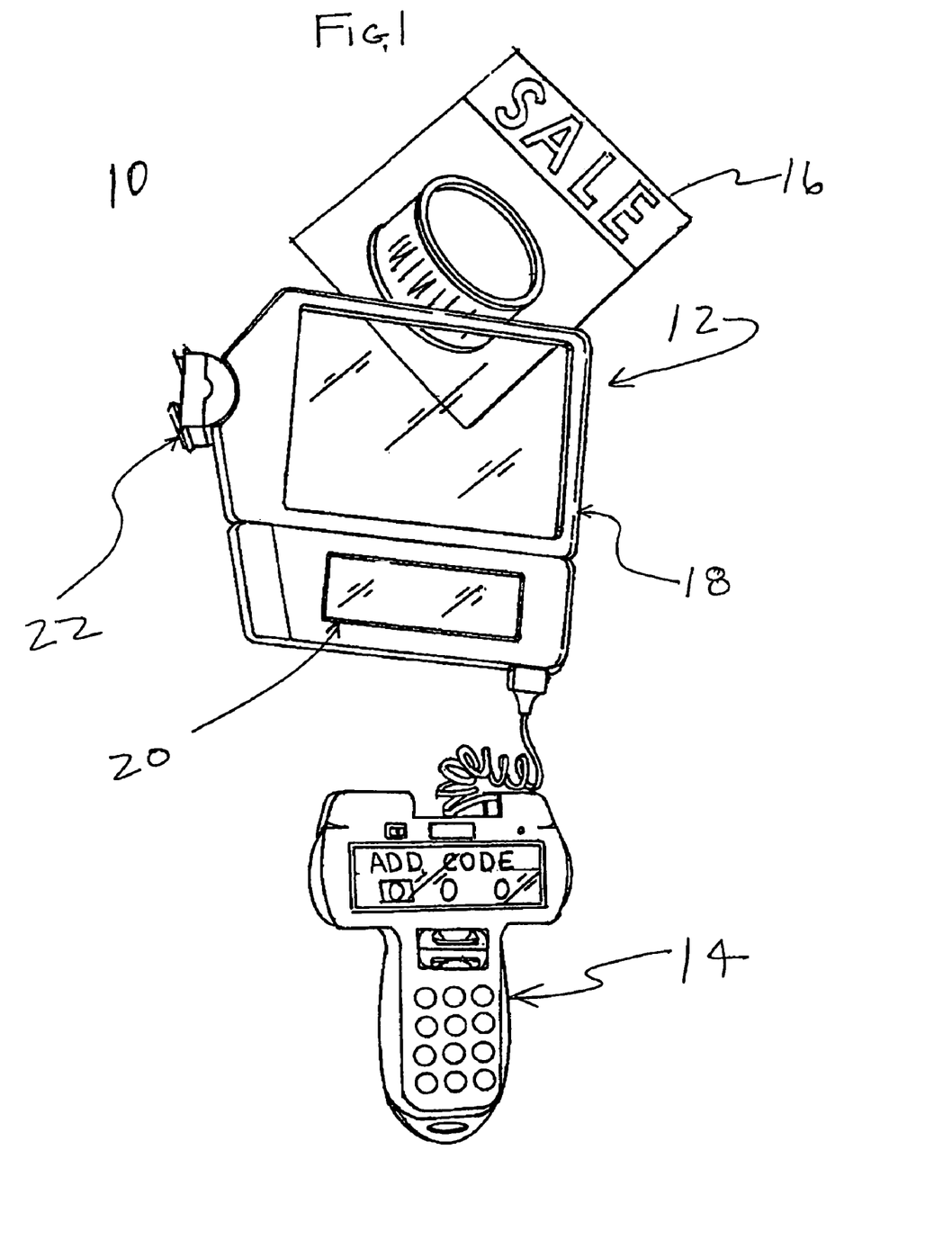
FIG. 1 is a perspective view of a product information and advertising device according to the invention.

An embodiment of the product information and advertising system 10 of the invention can be seen in FIG. 1. The embodiment of the invention in FIG. 1 is a point of sale advertising device 10. The embodiment in FIG. 1 shows a display mechanism 12, a programming mechanism 14, a printed insert 16, a frame member 18, one of the display screens 20 and an attachment member 22.

Figures 2A, 2B:
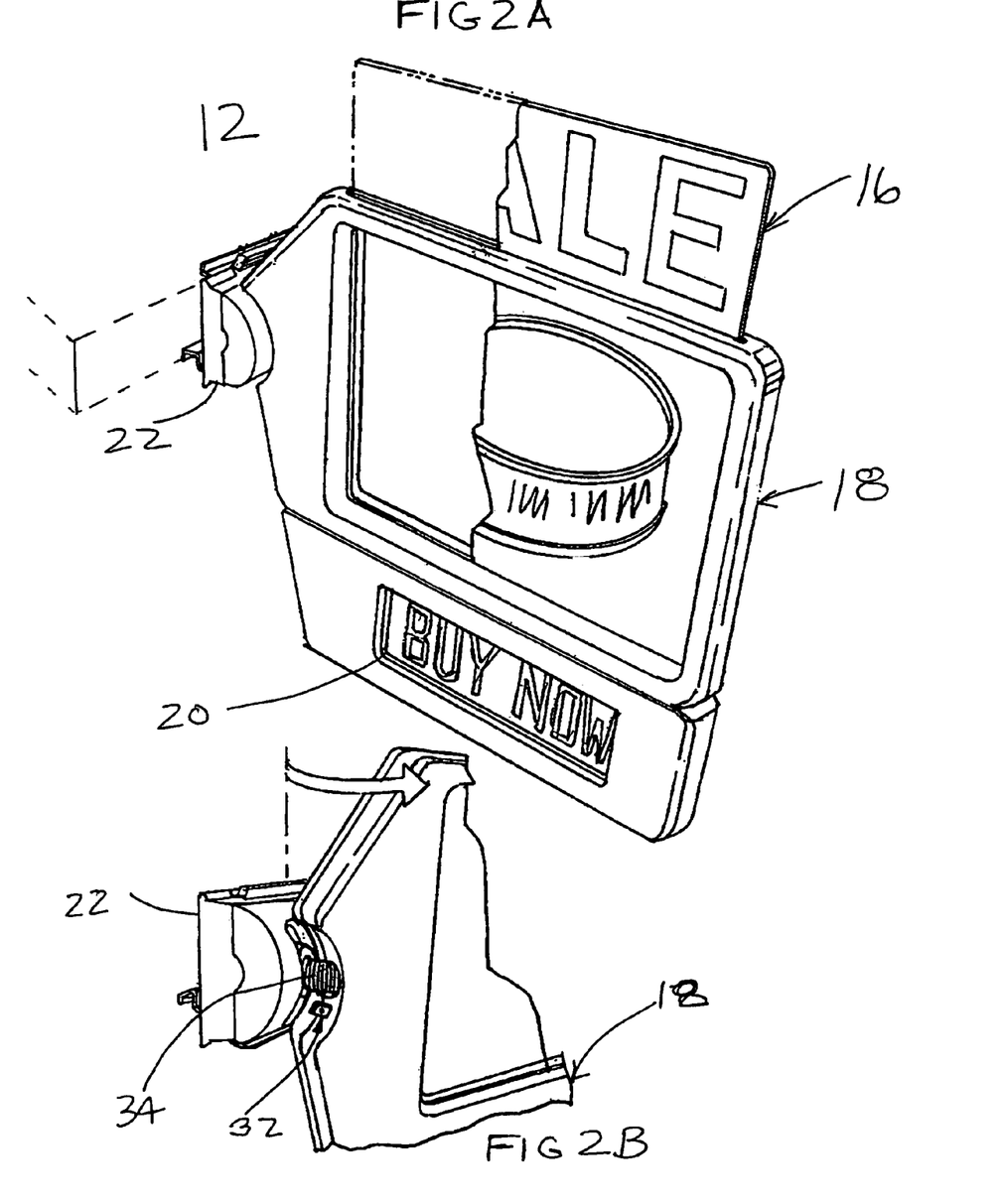
FIG. 2A is a perspective view of a display mechanism according to the invention.
FIG. 2B is a partial perspective view of a display mechanism according to the invention.

As can be generally seen in more detail in FIG. 2A the display mechanism 12 is designed to be to be attached to a store shelf at a point of sale the location with and attachment member 22. In FIG. 2A, the display mechanism is mounted a shelf is shown with dotted lines, and is mounted to extend in a perpendicular direction from the shelf edge into the aisle at an approximately 90 degree angle from the shelf edge. FIG. 2A shows the view front view of the display mechanism and the front display screen 20, while the rear side of the display mechanism and rear display screen 21 can be seen in FIG. 2C. Accordingly, each side of the display device has its own display screen 20, 21. This type of shelf mounting allows the front side and rear side of display mechanism 12 to face consumers approaching the display mechanism from opposite directions.

Display mechanism 12 is designed to be attached to a shelf edge with any type of attachment member 22. The attachment member 22 could be any one of a number of mechanisms known to those of skill in the art including, but not limited to, a bracket, clip, clamp or connector that allows display mechanism 12 to be attached and extend from the shelf edge. In the preferred embodiment the display mechanism is designed so that the front display screen 20 and rear display 21 screen face in opposite directions.

Figure 2C:
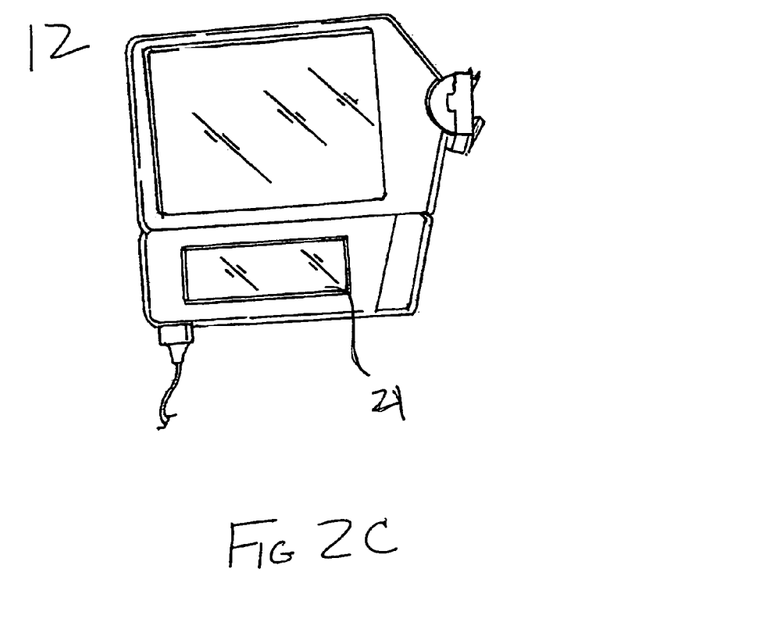
FIG. 2C is back perspective view of the display mechanism according to the invention.

As seen in FIGS. 2A and 2C the display mechanism 12 has two display screens 20, 21 on the front and rear of the display mechanism, preferable generally facing in two substantially different directions that allow consumers approaching the display mechanism from opposite directions of the aisle to see at least one of the screens. In the preferred embodiment the two display screens 20, 21 face in directions 180 degrees apart and are positioned generally perpendicular to the shelf edge upon which the display mechanism 12 is mounted. Those skilled in the art will recognize the screens can be positioned in a variety of was that will allow consumers to view one of the display screens 20, 21 when approaching the display mechanism from either the front or rear direction.

Figure 2D:
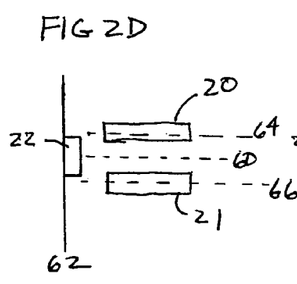
FIGS. 2D-F are schematics showing the relative position between the display screens for several different embodiments.
Figure 2E:
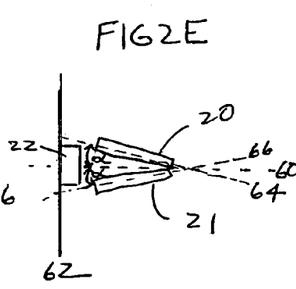
Figure 2F:
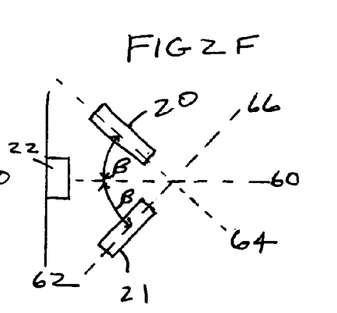

FIGS. 2D-2F show schematically, examples of the relative position of the display screens for several different embodiments. For example, FIG. 2D shows for one embodiment the relative position of the first display screen 20 and the second display screen 21 when mounted on a shelf edge 62 by the mounting device 22. The dotted line 60 represents the plane perpendicular to the shelf edge 62 in which the display mechanism is generally positioned when it is mounted on the shelf by the mounting device 22. In this example, the display screens 20 and 21 are positioned in display screen planes 64 and 66 respectively. Planes 64 and 66 are parallel to each other and parallel to the perpendicular plane 60. The display screen planes 64, 66 in which the display screens reside do not intersect with the perpendicular plane 60 of the display mechanism. In this example the display screens face away from each other in directions 180 degrees apart.

In FIG. 2E the schematic shows another embodiment with the display screens 20, 21 being mounted facing in substantially different directions. In this example, the display screens 20 and 21 are positioned in planes on an angle to the perpendicular plane 60. The display screen planes 64, 66 are not parallel to the perpendicular plane 60 and each plane 64 and 66 intersects with the perpendicular plane 60 at an angle α. The angle α is the angle measured between the perpendicular plane and the back of the display screen. In this embodiment the angle α is approximately 2½ degrees. Accordingly, the angle between the two display screens is approximately 5 degrees.

FIG. 2F is another embodiment with the display screens 20 and 21 are mounted facing in substantially different directions. In this example the display screen planes 64, 66 each intersect with the perpendicular plane 60 at an angle β. Again, the angle β is the angle measure between the perpendicular plane and the back of the display screen. In this embodiment the angle β is approximately 45 degrees resulting in the angle between the display screens being approximately 90 degrees.

While in each of the examples the angles formed by the planes of each display screens with the perpendicular plane 60 are equivalent, this is not required by the invention. Accordingly, those of skill in the art will recognize that the display screens 20 and 21 can be mounted in any variety of positions or angles provided they allow consumers approaching the display mechanism from opposite directions in the aisle to see one of display screens.

The display screens can be LED, LCD, plasma, or any other type of electronic display screen known to those of skill in the art. The display screens 20,21 must be of sufficient size to permit various messages to be shown. The preferred embodiment uses a high-contrast, anti-glare LCD screen. Any appropriate type of display screen could be used including monochrome and backlit displays.

In the preferred embodiment, a LCD display screen is used because it offers the best visibility for messages and allows the digital message stand out in the aisle. An LCD screen is also used because it is preferred to have a display screen that can display messages in a variety of visual formats. In the preferred embodiment LCD display screens with a 16×64 dot matrix are used. Other size display screens are also contemplated by the invention.

In the preferred embodiment the display screens 20, 21 can display a text or graphic message with several different dynamic visual effects or graphic action. How the graphics are displayed and how the graphics will move on the LCD is based on the data input into the device. For example, in the preferred embodiment, 10 digits are used, each digit indicating a different graphic action for how the graphics will move. A table is shown below.

Graphic Action Digit
1=Price effect 1+Text effect 1
2=Price effect 2+Text effect 1
3=Price effect 3+Text effect 1
4=Price effect 1+Text effect 2
5=Price effect 2+Text effect 2
6=Price effect 3+Text effect 2
7=Price effect 1+Text effect 3
8=Price effect 2+Text effect 3
9=Price effect 3+Text effect 3
0=Use socket ROM graphics In the preferred embodiment each of the ten graphic action digits above relates to a combination of one of three Price effects with one of three Text effects. Those of skill in the art would recognize there could be more combinations of such dynamic displays and additional graphic actions and graphic action indicators.

A description of the Price effects and Text effects used in the preferred embodiment are listed below. The descriptions describe how the pricing and text messages are dynamically displayed on the display screen.

Price Effect 1, Small—Medium_Large [in bold]. Small appears for 0.5 sees, Medium appears for 0.5 sees and large appears for 1.5 sees. Flash Large 2 times total.
Price Effect 2, Positive/Negative. Large [in bold] Price. Positive for 0.5 sec and negative for 0.5 sec. Repeat this sequence 3 times total.
Price Effect 3, Flashing. Large [in bold] Price. On positive for 1 sec then off for 0.5 sec. Repeat this sequence 3 times total.
Text Effect 1 Positive/Negative. Positive for 0.5 sec and negative for 0.5 sec. Repeat this sequence 3 times total.
Text Effect 2 Flashing. On positive for 1 sec then off for 0.5 sec. Repeat this sequence 3 times total.
Text Effect 3 Explode. On positive for 1 sec then off for 0.5 see, on for 1 sec then off for 0.5 sec and on for 1 sec ending in an exploded message~

In the preferred embodiment the selection of the graphic action digit determines how the pricing message and text message (or value message) will appear on the LCD. For example, if 5 is chosen as the graphic action digit, the price message will be displayed according to Price effect 2, meaning the price will first be displayed positive for 0.5 seconds, and in negative for 0.05 seconds and the sequence will be repeated three times before the text message is displayed. Further, when the Text message is displayed, it will be displayed according to Text effect 2, which means the text message will flash on for 1 second then off for 0.5 second and the sequence will be repeated 3 times before the price message is displayed again. Other types of dynamic displays of visual and graphic effects known to those of skill in the art could also be used.

In the preferred embodiment the display mechanism is powered by batteries however, the display mechanism could be powered by any type of power source including, but not limited to, light panels or a direct electrical power source such as those incorporated into the shelf units.

Figure 3:
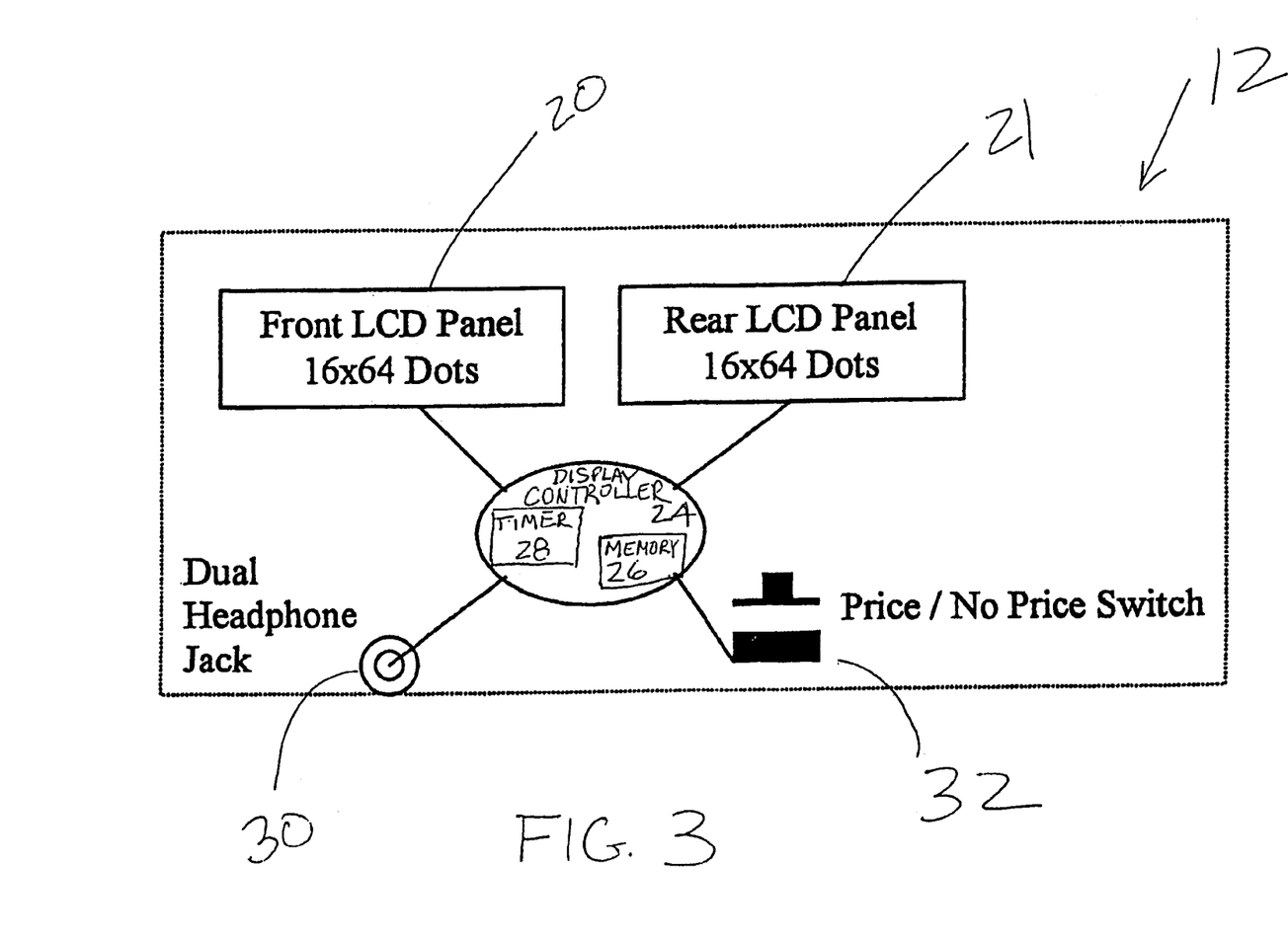
FIG. 3 is a schematic of the display mechanism according to the invention.

As shown in FIG. 3. display mechanism 12 has a front display panel 20, a rear display panel 21, a display controller 24, a data receipt port 30 and a price control switch 32. The display controller 24 can be an integrated circuit, a processor or a master controller of some type capable of receiving electronic signals or data as messages or instructions indicating the message, pricing, text, numbers, graphics or other material to be displayed on the display screens 20, 21. The display controller 24 is in communication with the two display screens 20, 21, and a price control switch 32. The display controller 24 is designed to receive data related to display instructions for messages, such as value messages and price information, from an outside source through a data receipt port 30. The display controller 24 includes a memory 26 to store display instructions and messages.

For example, the display mechanism 12 can receive data indicating pricing information for the product at the point of sale location. After the receiving the pricing information data indicating the price message to be displayed on the display screens 20, 21 the display controller 24 stores the information the memory 26. Typically, the price message would be the price for the product being displayed at the point of sale.

The display controller 24 is also adapted to receive and store timing instructions for how long a price message should be displayed on the display screen. The timing instruction indicates the time, such as an hour or day of week, a price message should no longer be displayed on the display screens. The display controller 24 receives timing instructions and stores the instructions for the time period the price message should be displayed. The display controller 24 includes a clock/timer 28 that is used by the display controller to measure the time period and determine the proper time to send the timing instruction to terminate display of the pricing message, or any other type of message on the display screens 20, 21 based on the timing instructions. The clock/timer 28 can also be used by the display controller 24 to control the time period any other type of message is displayed on the display screens 20, 21 based on timing instructions. When the price message has been displayed for the time period indicated by the timing instructions the display of the message is turned off. Use of the built in timer insures the accuracy of the time periods when pricing and messages are displayed.

When pricing, value and quality messages are programmed into the display mechanism the user can pre-set the time period or duration for each message to be displayed. The display mechanism 12 will then automatically turn off the pricing message only, or turn off all message and replace it with a default message. In the present embodiment, pre-setting the time period for display of the pricing message is done by indicating the day of the week the display of the pricing message is to determinate through use of the programming mechanism keypad 40. This feature ensures pricing integrity when the store changes its prices and a programmer cannot get back in to the store to update the pricing stored in the display mechanism 12 on a timely basis. For example the user could set the device to display a price for only one day, for a few days, a week, several weeks or longer based on how long the store desires to offer the particular price. If the programmer does not return to the device at the time the price expires, the display mechanism will automatically terminate the display of the pricing message at the preset time. Such programming can be important especially in industries where product pricing typically runs on 4 week cycles with a year being made up of 13 cycles. The display device 10 allows the user to set pricing and other messages to run for a week, a 4 week cycle or even longer to coincide with a store's pricing cycle.

The display controller also has the capability to store instructions for displaying value messages on the display screens. The value messages can be any type of message that relates to a product being advertised or sold. Examples of the value messages can be seen below and are only meant as examples while those of skill in the art could think of other alternative value messages.

| | |
|---|---|
| BUY NOW! | CHECK IT OUT! |
| SAVE! | ACT NOW & SAVE! |
| INTRODUCING | LIMITED TIME |
| GREAT PRICE | SPECIAL |
| GREAT VALUE | ANNOUNCING |
| GOOD NUTRITION | REDUCED |
| GREAT TASTING | TODAY |
| HEALTHY | GREAT NEWS |
| NUTRITIOUS | NOW |
| FAST AND EASY | LONGER LASTING |
| LOW CALORIE | WANT RELIEF? |
| LOW CARB | HUNGRY? |
| MORE VALUE | FREE OFFER |
| NEW! | REBATE OFFER |
| IMPROVED | MORE |
| SPECIAL OFFER | WOW! |
| NEW SIZE | SAVE NOW! |
| NEW PACKAGE | SAVE TODAY! |

In the preferred embodiment these value messages are chose based on text message digits. Each value message is assigned a two digit number. When those two digits are entered into the display device, the message assigned to those two digits is displayed. The value messages are displayed on the LCD display panel according to the graphic action digit selected by the user. It is contemplated by the invention that multiple value messages can also be displayed together. For example, one value message such as "wow" could be displayed for a period of one second then turned off and second message such as "new package" could be displayed for one second, and then the process repeated.

Data receipt port 30 is connected to the display controller 24 and allows for the receipt of timing instructions, value messages or any other type of data or instructions to be received by the display mechanism. In the preferred embodiment, the data receipt port 30 is a dual head phone jack port that will accept a dual head phone jack 46 for the transmission of data and instructions to the display controller 24 that indicate what messages are to be displayed and how they visually appear on the display panels.

As shown in FIG. 2B, the display mechanism 12 also includes a control switch 32, which in the preferred embodiment is concealed from view and that when actuated overrides any pricing message that is being displayed. The control switch 32 is located on an edge of the display frame member 18 that faces the shelf mounting portion 22 and away from the store aisle when the display mechanism 12 is mounted on a store shelf. In the preferred embodiment the control switch 32 is inconspicuously located and can only be accessed when the frame member 18 is forcibly twisted out of position as seen in FIG. 2B. To gain access to control switch 32, a force is applied to the display frame member 18 to cause the display frame member 18 to rotate away from its resting position, as show by the arrow in the FIG. 2B. The rotation makes the switch 32 accessible for manual operation. The switch 32 in the preferred embodiment is actuated by manual pressure using a pencil or some other type of stylus but any type of switch could be used by those of skill in art.

Because control switch 32 should be inconspicuously located and generally difficult to access, in the preferred embodiment, a force must be applied sufficient to overcome the spring 34 that connects the display mechanism 12 to the shelf bracket 22. The switch 32 is hidden in a cryptic, generally inaccessible location to prevent its unauthorized use. The invention contemplates locating the switch 32 in a cryptic location which prevents its easy actuation by unauthorized users. The switch 32 is meant to be used only by authorized users such as store managers, store personnel or authorized programmers in the event there is a need to override the pricing message. The need to override the price message may occur if the price message is wrong or the time period for the pricing has expired and the programming mechanism is not available to correct or reprogram the price. In such situations, the price message can be turned off by manually actuating the control switch 32 for a time period until the programming mechanism is available to re-program the price message.

The control switch 32 can be placed in any inconspicuous area where it would not be easily found or recognized by the general public as an override switch. The concealment is to prevent unauthorized price tampering. In the preferred embodiment the switch 32 is used to toggle the display of the price message on and off. For example, the first activation of the control switch 32 will turn off the display of the price message. A second activation of the switch will re-establish display of the price message. If activated yet again, the switch 32 will again turn off the price message. Accordingly, each subsequent activation of the switch 32 will change the status of the display of the price message.

Figure 4A:
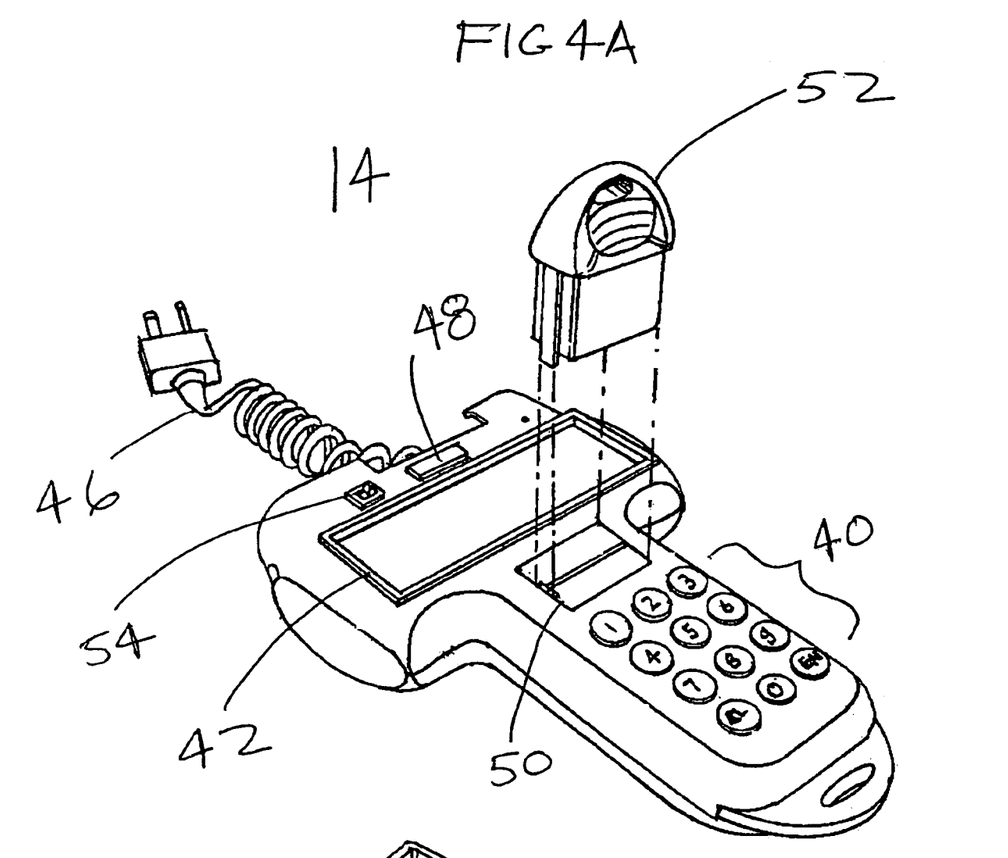
FIG. 4A is a perspective view of the programming mechanism
Figure 5:
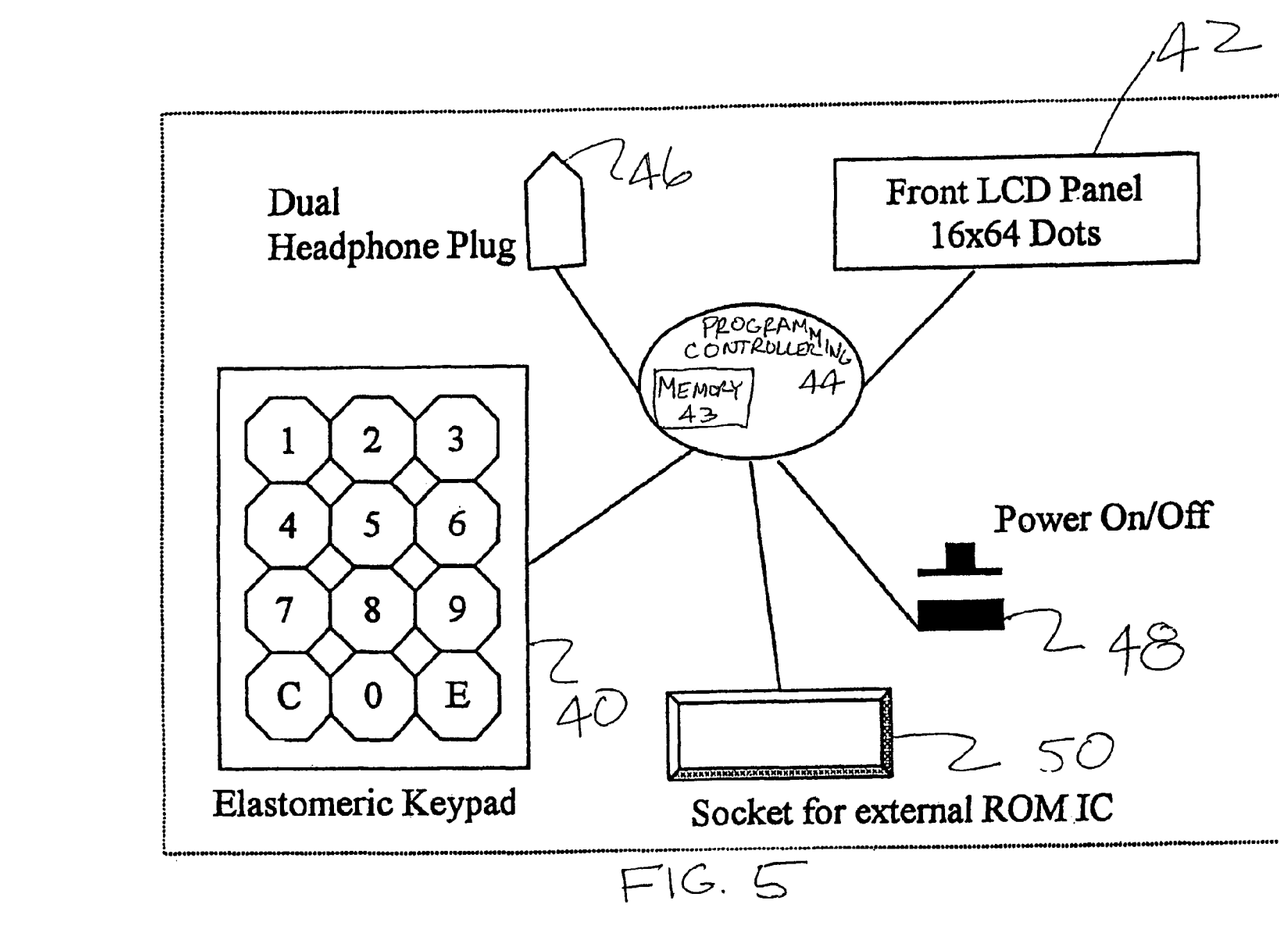
FIG. 5 is a schematic of the programming mechanism

As seen in FIGS. 4A and 5 the system includes a programming mechanism 14, which can be a personal computer, smaller processor or a hand held device. The programming mechanism 14 has a data input mechanism 40 such as a key pad, a display screen 42, a programming controller or processor 44, a data transfer interface 46, and an on/off switch 48.

In the preferred embodiment, the programming mechanism 14 has a keypad 40 to allow the user to input data to indicate the proper pricing and value message to be displayed on the display mechanism along with the timing instructions graphic action digits or text message digits. The programming mechanism can also include pre-stored programs with graphics or simple animations made up of graphic elements moving to different positions on the screen. For example, one simple graphic could be a cup with a drop of liquid falling from the lip of the cup. Other similar type graphics could also be used and would be known to those of ordinary skill in the art.

The programming mechanism 14 can be any kind of device that allows data or instructions to be loaded into the memory of the display mechanism 12. The programming mechanism could be a laptop computer, a smaller processor device, a pda type device or a hand held programmer. The programming mechanism 14 can be adapted to use any type of data input mechanism 40 such as a single key a joy stick, i-pod button type circular ring or touch pad. The display screen 42 of the programming mechanism 14 then presents the user with a series of instructions through a menu that allows the user to select and confirm the messages and instructions to be loaded into the display mechanism 12.

The hand held programmer 14 includes a memory 43 that stores multiple messages and instructions including pricing messages and timing instructions, value messages and graphic display functions. The preferred embodiment includes more than 80 different preprogrammed value messages. Display screen 42 that permits the user to see the value, price or other messages that are being programmed into the display mechanism 12. This allows the user to confirm the proper instructions and messages are being loaded into the display mechanism 12.

Figure 4B:
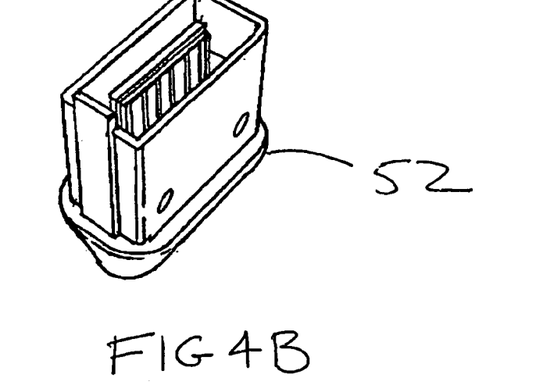
FIG. 4B is a perspective view of an external memory.

Messages can also be customized or include graphics. As seen in FIGS. 4*a* and 4*b*, the programming mechanism can also include a socket 50 for external memory such as an IC 52 that can store additional messages or graphics that can by pass the pre-programmed messages and incorporate specialty customer messages or graphics in its place. FIGS. 4*a* and 4*b* show one embodiment having external memory of a ROM IC circuit 52. However, those of ordinary skill in the art will recognize that many othe different types of external memory could be used. Typically, the messages and instructions will be programmed and maintained with the display mechanism 12 on weekly basis.

The hand held programmer 14 also includes batteries as a power source. The hand held programmer 14 has a battery on/off switch 54 to permit the programmer to be turned off to conserve battery life when not in use.

The data transfer interface 46 permits the programming mechanism to transmit its messages and instructions to the display mechanism 12. Various interfaces could be used by those skilled in the art such as infrared, wifi, blue tooth or hardwiring. The preferred embodiment uses a hard wired system 46 to transfer the data because it is a relatively inexpensive system and can transmit the data and instructions in a relatively short time period.

In the preferred embodiment the programming mechanism 14 has a hard wired data interface connection 46 that directly connects the programming mechanism 14 to the display device 12 via a data receipt port 30. The programming mechanism 14 then programs the messages and instructions to be displayed by the display mechanism 12 by down loading and communicating the messages and instructions to display controller 24 through the hard wired connection 30, 46. The preferred embodiment uses a two prong dual head phone jack 46 to connect the programming mechanism 14 to the display mechanism 12. However, those of skill the art recognize that other types of connections could also be used to transfer data between the programming mechanism 14 and display mechanism 14.

Printed insert materials 16 containing any type of product message can also be included with the point of sale display device. As seen in FIG. 1, the display device has a frame 18 that allows for insertion of the printed material 16. Typically the printed material is printed on both sides permitting the printed material to be visible from the front and rear sides of the display mechanism 12. The printed insert can include any type of desired marketing message.

Although the invention has been described with reference to a particular arrangement of parts, features and the like, these are not intended to exhaust all the possible arrangements or features, and indeed many other modifications and variations will be ascertainable to those of skill in the art.

What is claimed is:

1. A point of sale advertising device having a display mechanism, said display mechanism having;

a first screen and a second screen, said first screen and said second screen facing in different directions;

a display controller in communication with said first screen and said second screen, said display controller adapted to receive a price message and a timing instruction, to store said price message and said timing instruction, and to transfer said price message to said first screen and said second screen for display on said first screen and said second screen for a time period indicated by said stored timing instruction; and a price control switch in communication with said display controller, said price control switch being adapted to be actuated manually, and when actuated, preventing said price message from being displayed on said first screen and said second screen;

wherein said price control switch is located in a cryptic location on said display mechanism.

2. The point of sale advertising device of claim 1 wherein said price message is displayed dynamically on said first screen and said second screen based on display instructions stored by said display controller.

3. The point of sale advertising device of claim 1 wherein said display controller is further adapted to receive a value message, to store said value message and to transfer said value message to said first screen and said second screen for displaying said value message.

4. The point of sale advertising device of claim 3 wherein said price message and said value message are displayed dynamically on said first screen and said second screen based on display instructions stored by said display controller.

5. The point of sale advertising device of claim 4 wherein said price message and said value message are displayed alternatively.

6. The point of sale advertising device of claim 4 where in said first screen and said second screen are positioned such that the angle between the first and second display screen is in the range from zero to 90 degrees.

7. A point of sale advertising device having a display mechanism, said display mechanism having;

a first screen and a second screen, said first screen and said second screen facing in different directions;

a display controller in communication with said first screen and said second screen, said display controller adapted to receive a price message and a timing instruction, to store said price message and said timing instruction, and to transfer said price message to said first screen and said second screen for display on said first screen and said second screen for a time period indicated by said stored timing instruction; and a price control switch in communication with said display controller, said price control switch being adapted to be actuated manually, and when actuated, preventing said price message from being displayed on said first screen and said second screen; and a programming mechanism, said programming mechanism having:

a message transfer member adapted to communicate with said display mechanism, said message transfer member being adapted to transfer messages and instructions to said display controller;

a programming controller in communication with said message transfer member, said programming controller being adapted to receive data and convert said data to said price message and said timing instruction; and a data interface in communication with said programming controller, said data interface being adapted to receive data from a user, said data indicating said price message to be displayed on said first screen and said second screen, and indicating said timing instruction for the time period said price message is to be displayed on said first screen and said second screen.

8. The point of sale advertising device of claim 7 wherein said programming controller is further adapted to receive data and convert said data to a value message and said display controller is further adapted to receive said value message from said programming mechanism, to store said value message and to transfer said value message to said first screen and said second screen for displaying said value message.

9. The point of sale advertising device of claim 8 wherein said price control switch is located in a cryptic location on said display mechanism.

10. The point of sale advertising device of claim 8 wherein said programming mechanism includes a memory with pre-stored value messages that can be displayed on said display mechanism.

11. The point of sale advertising device of claim 10 wherein said programming mechanism is physically connected to said display mechanism when said pricing message, said timing instruction and said value message are being transferred from said programming mechanism to said display mechanism.

12. The point of sale advertising device of claim 8 wherein said price message and said value message are displayed dynamically on said first screen and said second screen based on display instructions sent by said programming mechanism to said display controller and stored by said display controller.

13. The point of sale advertising device of claim 12 wherein said price message and said value message are displayed alternatively.

14. The point of sale advertising device of claim 7 wherein said programming mechanism includes a memory with pre-stored value messages that can be displayed on said display mechanism.

15. The point of sale advertising device of claim 7 wherein said price message is displayed dynamically on said first screen and said second screen based on display instructions stored by said display controller.

16. A point of sale advertising device having a display mechanism and a programming mechanism adapted to interface with said display mechanism to transfer a price message and a timing instruction to said display mechanism:

said display mechanism having;

a first screen and a second screen, said first screen and said second screen facing in different directions;

a display controller in communication with said first screen and said second screen, said display controller adapted to receive a price message and a timing instruction, to store said price message and said timing instruction, and to transfer said price message to said first screen and said second screen for display on said first screen and said second screen for a time period indicated by said stored timing instruction;

a price control switch in communication with said display controller, said price controller being adapted to be actuated manually, and when actuated, preventing said price message from being displayed on said first screen and said second screen;

said programming mechanism having;

a message transfer member adapted to communicate with said display controller, said message transfer member being adapted to transfer messages and instructions to said display controller;

a programming controller in communication with said message transfer member, said programming controller being adapted to receive data and convert said data to said price message and said timing instruction;

a data interface in communication with said programming controller, said data interface being adapted to receive data from a user, said data indicating said price message to be displayed on said first screen and said second screen, and indicating said timing instruction for the time period said price message is to be displayed on said first screen and said second screen; and wherein said price message is displayed dynamically on said first screen and said second screen based on display instructions stored by said display controller.

17. A method for advertising at a point of sale location having the steps of:

mounting a display mechanism to a shelf, said display mechanism having a first screen and a second screen facing in directions a least 90 degrees apart;

connecting a programming mechanism to said display mechanism;

inputting pricing data to the programming mechanism, converting said pricing data to a pricing message and communicating said price message to said display mechanism;

inputting timing instruction data to said programming mechanism, converting said timing instruction data to a timing instruction and communicating said timing instruction to said display mechanism;

inputting value message data to said programming mechanism, converting said value message data to a value message and communicating said value message to said display mechanism;

storing said price message, said timing instruction and said value message in said display mechanism;

disconnecting said programming mechanism from said display mechanism;

displaying said price message on said first screen and said second screen;

displaying said value message on said first screen and said second screen;

repeating the last two steps; and terminating the display of said price message according to said timing instruction.

18. The method of claim 17 further including the steps of:

inputting display instruction data to said programming mechanism, converting said display instruction data to a display instruction and communicating said display instruction to said display mechanism;

storing said display instruction in said display mechanism;

displaying said price message in accordance with said display instruction on said first screen and said second screen; and displaying said value message in accordance with said display instruction, on said first screen and said second screen.

19. The method of claim 18 further including the step of:
manually actuating a control switch to terminate the display of said pricing message prior to the time dictated by the timing instruction; and
manually actuating said control switch a second time to reinitiate the display of said pricing message for the time dictated by the timing instruction.

20. The method of claim 17 further including the step of:
manually actuating a control switch to terminate the display of said pricing message prior to the time dictated by the timing instruction.

* * * * *